H. KUXMANN & G. SCHNEIDER.
AUTOMATIC CATTLE FEEDING APPARATUS.
APPLICATION FILED APR. 15, 1912.
1,112,918.
Patented Oct. 6, 1914.
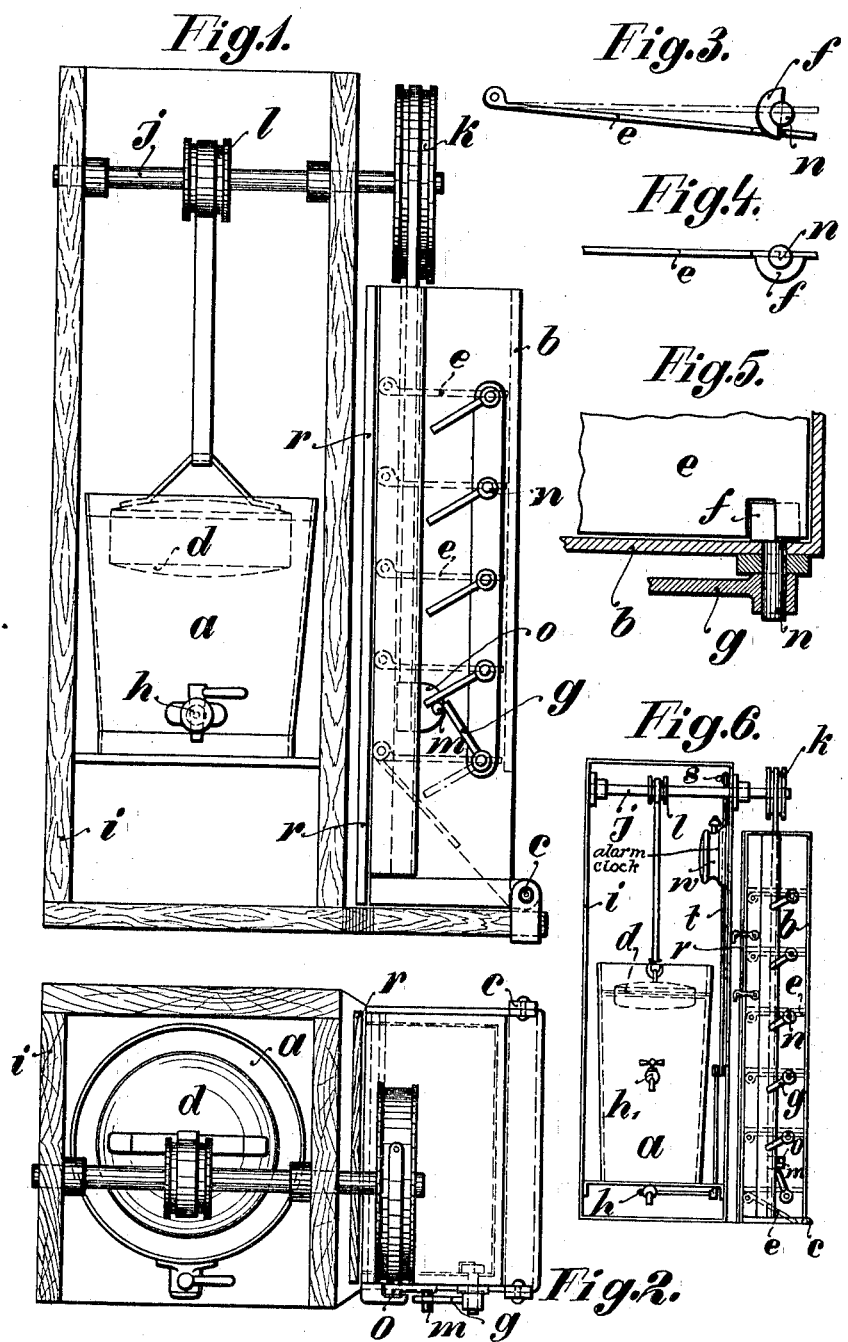

UNITED STATES PATENT OFFICE.

HEINRICH KUXMANN AND GEORG SCHNEIDER, OF BIELEFELD, GERMANY.

AUTOMATIC CATTLE-FEEDING APPARATUS.

1,112,918. Specification of Letters Patent. Patented Oct. 6, 1914.

Application filed April 15, 1912. Serial No. 690,863.

*To all whom it may concern:*

Be it known that we, HEINRICH KUXMANN and GEORG SCHNEIDER, subjects of the King of Prussia, and residents at Bielefeld, in the Province of Westphalia, Kingdom of Prussia, German Empire, have invented a certain new and useful Automatic Cattle-Feeding Apparatus, of which the following is a specification.

This invention relates to an automatic cattle feeding apparatus.

Apparatuses which supply food to cattle automatically at a predetermined time and in separate portions, have hitherto been constructed in such a manner that the food was placed in the divisions of a drum which was set in rotation. The separate divisions were consecutively opened and permitted the food to fall into the manger. The actuation of such automatic feeding devices is effected by means of a clockwork or water wheel. Other apparatuses are known in which by means of a clockwork separate fixed receptacles were consecutively opened. In other devices again there is suspended from the one limb of a balance, a water receptacle and on the other limb a feed receptacle. By the excess weight on the one or the other side of the balance in consequence of the discharge of the water or of the food, the balance swings and by this motion opens the food container in such a manner that a portion of the food is discharged. In the present invention also a dropping receptacle is made use of for the automatic release of the separate food receptacles.

The novelty of the present device consists in placing a float in the stationary water receptacle, which float sinks with the outflow of the water and thereby transfers its motion directly to a bar or a traction member, which successively releases the locking catches of the division covers of the food container. This improvement possesses the advantage of the greatest simplicity combined with full security for the action desired.

In the accompanying drawing, this apparatus is illustrated—in Figure 1 in side elevation, and in Fig. 2 in plan view. Figs. 3, 4 and 5 show the releasing device for the hinged bottom. Fig. 6 shows a constructional modification of the apparatus for feeding twice.

The water receptacle $a$ which terminates below in a tapering form is placed in the box $i$ and has immediately above the bottom a cock $h$, which by means of a clockwork (not shown on the drawing) or even by hand, is opened at a predetermined time. In the water receptacle there is placed a float $d$ which is suspended by a strap passing over a pulley $l$. The shaft $j$ of this pulley $l$ is journaled horizontally in the casing $i$ and possesses a second pulley $k$ over which is suspended likewise a strap, but in the opposite direction of rotation to that of the float strap. At the end of this second strap there is attached the sliding piece $o$, which travels in a groove on the food receptacle $b$ and bears a projection $m$, which on its up and down motion turns the levers $g$ and consequently the links $n$ by an angle of 90°. Each link $n$ which is rotatably supported in the wall of the food receptacle $p$ possesses at the end lying in the box the cam $f$ upon which when it turns, the flat side upward, is supported the movable bottom $e$ (Figs 1 and 4). If, however, by means of the lever $g$ the flat side of this cam $f$ is adjusted vertically, then the bottom $o$ falls down in consequence of the slot made therein, past the cam $f$ and falling down thus opens the chamber (Figs. 1 and 3). If the receptacle $b$ is to be filled with food, then the strap over the pulley $k$ is taken off and the box is placed horizontal by means of the hinge $c$. Thereupon after the opening of the flap $r$ the food can easily be poured in. Previously, however, the bottom $e$ has been shut and the sliding piece $o$ brought into its lowest position and the lever $g$ placed in such a position that the cams $f$ support the flaps $e$. The straps must be so proportioned that when the sliding piece $o$ is in the lowermost position, the float is at its highest, that is to say it floats upon the feed receptacle with the strap tight.

The mode of operation of the apparatus is as follows: At feeding time there is opened, either by clockwork or by hand, the cock $h$ of the water receptacle. The water then flows slowly into the watering trough and the float sinks. Thereby the strap uncoils itself from the pulley $l$, revolving the shaft thereof, and consequently also the pulley $k$, whereby the sliding piece $o$ is raised. Simultaneously with the falling of the water level in $a$ the rising of the piece $o$ takes place and this turns consecutively by means of the projection $m$ the levers $g$ in such a manner that each half projection $f$ releases each flap $e$, and consequently the separate chambers of $b$ are opened and the food falls into the manger. In order, however, that the float may sink uniformly and that the rate of fall of the water level may remain uniform, the vessel $a$ must become narrower underneath, because with the sinking of the water level the quantity of water flowing out in a unit of time decrease in consequence of the reducing pressure. The sectional area of the container $a$ must therefore be diminished downward in proportion to the diminution of pressure of the outflow. This necessary tapering may be calculated and by this means there is attained, that the supply of food will be effected absolutely uniformly. Moreover by adjustment of the amount of opening of the cock, the speed of this feeding can be exactly adjusted.

If the apparatus is to be adapted for more than one feeding, for instance, for an evening and a morning feeding, then it can be easily arranged for the purpose. In such a case it is only necessary to increase correspondingly the size of the food divisions or to increase their number and also to make the water receptacle $a$ correspondingly wider and higher, and provide it with a second outflow cock $h'$, preferably placed about the middle of the water column height. For the evening feeding, the food boxes and the water receptacle are completely filled. When the servant has brought the animal into the stall, he only needs to open the upper cock $h'$ by hand and has then nothing more to do with the feeding thereof. When the water has flowed out down to the cock $h'$ the evening feeding ceases. The morning feeding can only begin when the lower cock $h$ is opened. This is operated by the alarm clock $w$ which at the predetermined time lets fall a rod $t$ which has been raised by hand by means of the knob $s$ which rod opens the cock $h$ by aid of suitable intermediate levers and shafts. The opening of the cock might also be effected if desired by hand. In like manner the apparatus might be so constructed by corresponding increase in size and the fixing of a third cock that all the three daily feeds could be provided for at one operation.

Having now particularly described and ascertained the nature of our said invention and in what manner the same is to be performed, we declare that what we claim is:

1. A stock feeding and watering apparatus comprising in combination, a frame, a receptacle for supplying water to a feeding place, a float upon the water within said receptacle, means for regulating said supply of water, a shaft horizontally disposed within said frame, a pulley and strap connection upon said shaft from which said float is suspended, a food receptacle comprising a plurality of superposed food containing compartments provided with trap bottoms adapted to be successively opened in harmony with the movements of said float, means connected to said shaft and to said receptacle for successively opening said trap bottoms upon the operation of said means regulating the supply of water, and means for normally holding the trap bottoms closed.

2. A stock feeding and watering apparatus comprising in combination, a frame, a receptacle tapering toward below for supplying water to a feeding place, a float upon the water within said receptacle, a cock for regulating said water supply, a shaft horizontally disposed within said frame above said receptacle, a pulley upon said shaft, a strap secured to said pulley from which said float is suspended, a food receptacle, a pulley upon the outer end of said shaft adapted to rotate in the same direction as said first-named pulley, a strap secured to said pulley from which said food receptacle is suspended, a plurality of superposed food containing compartments, hinged trap bottoms for said compartments, means for holding said trap bottoms normally closed and means for successively engaging said holding means in harmony with the operation of said water supply controlling means for opening said traps one by one, substantially as described.

3. A stock feeding and watering apparatus comprising in combination, a frame, a receptacle tapering toward below for supplying water to a feeding place, a float upon the water within said receptacle, a cock for regulating said water supply, a shaft horizontally disposed within said frame above said receptacle, a pulley upon said shaft, a strap secured to said pulley from which said float is suspended, a food receptacle, a pulley upon the outer end of said shaft adapted to rotate in the same direction as said first-named pulley, a strap secured to said pulley from which said food receptacle is suspended, a plurality of superposed food containing compartments, hinged trap bottoms for said compartments, cams supporting said bottoms opposite their hinged ends for normally holding said traps closed, links rotatably supported in the wall of said food receptacle carrying said cams, levers secured to said catches, and a slide traveling vertically within a groove of said receptacle in harmony with the lowering of said float and provided with a pin adapted to successively engage said levers for releasing said catches and opening said traps.

In testimony whereof we have signed our names to this specification in the presence of two subscribing witnesses.

HEINRICH KUXMANN.
GEORG SCHNEIDER.

Witnesses:
ARTHUR R. SOLLE,
MINNA CASSEL.

Copies of this patent may be obtained for five cents each, by addressing the "Commissioner of Patents, Washington, D. C."